US009202598B2

(12) United States Patent
Russell, II et al.

(10) Patent No.: US 9,202,598 B2
(45) Date of Patent: Dec. 1, 2015

(54) FAIL-FREE FUEL BUNDLE ASSEMBLY

(75) Inventors: William Earl Russell, II, Wilmington, NC (US); Christopher J. Monetta, Wilmington, NC (US); John D. Fuller, Wilmington, NC (US); Lukas Trosman, Wilmington, NC (US); David Grey Smith, Leland, NC (US); Carlton Wayne Clark, Wilmington, NC (US); Robert Bryant James, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1111 days.

(21) Appl. No.: 11/946,272

(22) Filed: Nov. 28, 2007

(65) Prior Publication Data
US 2009/0135988 A1   May 28, 2009

(51) Int. Cl.
G21C 3/34 (2006.01)
G21C 3/14 (2006.01)
G21C 3/326 (2006.01)
G21C 3/344 (2006.01)

(52) U.S. Cl.
CPC  *G21C 3/14* (2013.01); *G21C 3/326* (2013.01); *G21C 3/344* (2013.01); *G21Y 2002/303* (2013.01); *G21Y 2004/30* (2013.01); *Y02E 30/38* (2013.01)

(58) Field of Classification Search
USPC ......... 376/438, 462, 433, 428, 426, 429, 440; 3/438, 462
See application file for complete search history.

(56) References Cited

U.S. PATENT DOCUMENTS

| 3,015,616 | A | * | 1/1962 | Sturtz et al. | 376/440 |
| 3,147,191 | A | * | 9/1964 | Crowther | 376/172 |
| 3,218,237 | A | * | 11/1965 | Stoker et al. | 376/423 |
| 3,274,067 | A | | 9/1966 | Greebler et al. | |
| 3,940,318 | A | | 2/1976 | Arino et al. | |
| 3,998,691 | A | | 12/1976 | Shikata et al. | |
| 4,196,047 | A | | 4/1980 | Mitchem et al. | |

(Continued)

FOREIGN PATENT DOCUMENTS

| CN | 1051452 A | 5/1991 |
| EP | 0201859 | 11/1986 |

(Continued)

OTHER PUBLICATIONS

JP 2006-162613 A (Machine Translation).*

(Continued)

*Primary Examiner* — Jack W Keith
*Assistant Examiner* — Marshall O'Connor
(74) *Attorney, Agent, or Firm* — Harness, Dickey & Pierce, P.L.C.

(57) ABSTRACT

A fuel bundle for a nuclear reactor core is provided. The fuel bundle may include a plurality of rods comprised of nuclear fuel rods and/or isotope production rods. Each rod includes a plurality of interconnected rod segments, wherein at least two of the rod segments of at least one rod have different outside diameters. The fuel bundle may additionally include a plurality of rod spacer grids securely retained between axially adjacent, interconnected rod segments. The rod spacer grids interconnected between axially adjacent rod segments form an array of substantially equally spaced rods. The fuel bundle may further include an elongate tubular channel in which the arrayed rods are housed.

20 Claims, 6 Drawing Sheets

(56) References Cited

U.S. PATENT DOCUMENTS

| | | | |
|---|---|---|---|
| 4,284,472 A | 8/1981 | Pomares et al. |
| 4,462,956 A | 7/1984 | Boiron et al. |
| 4,475,948 A | 10/1984 | Cawley et al. |
| 4,493,813 A | 1/1985 | Loriot et al. |
| 4,532,102 A | 7/1985 | Cawley |
| 4,597,936 A | 7/1986 | Kaae |
| 4,617,985 A | 10/1986 | Triggs et al. |
| 4,663,111 A | 5/1987 | Kim et al. |
| 4,729,903 A | 3/1988 | McGovern et al. |
| 4,782,231 A | 11/1988 | Svoboda et al. |
| 4,859,431 A | 8/1989 | Ehrhardt |
| 5,053,186 A | 10/1991 | Vanderheyden et al. |
| 5,145,636 A | 9/1992 | Vanderhevden et al. |
| 5,198,186 A | 3/1993 | Ogiya et al. |
| 5,347,550 A | 9/1994 | Tanabe et al. |
| 5,355,394 A | 10/1994 | Van Geel et al. |
| 5,400,375 A | 3/1995 | Suzuki et al. |
| 5,513,226 A | 4/1996 | Baxter et al. |
| 5,596,611 A | 1/1997 | Ball |
| 5,615,238 A | 3/1997 | Wiencek et al. |
| 5,633,900 A | 5/1997 | Hassal |
| 5,682,409 A | 10/1997 | Caine |
| 5,758,254 A | 5/1998 | Kawamura et al. |
| 5,867,546 A | 2/1999 | Hassal |
| 5,871,708 A | 2/1999 | Park et al. |
| 5,910,971 A | 6/1999 | Ponomarev-Stepnoy et al. |
| 6,056,929 A | 5/2000 | Hassal |
| 6,160,862 A | 12/2000 | Wiencek et al. |
| 6,192,095 B1 | 2/2001 | Sekine et al. |
| 6,233,299 B1 | 5/2001 | Wakabayashi |
| 6,327,324 B2* | 12/2001 | Nylund .................. 376/433 |
| 6,347,130 B1* | 2/2002 | Nylund .................. 376/433 |
| 6,456,680 B1 | 9/2002 | Abalin et al. |
| 6,678,344 B2 | 1/2004 | O'Leary et al. |
| 6,751,280 B2 | 6/2004 | Mirzadeh et al. |
| 6,804,319 B1 | 10/2004 | Mirzadeh et al. |
| 6,895,064 B2 | 5/2005 | Ritter |
| 6,896,716 B1 | 5/2005 | Jones, Jr. |
| 7,157,061 B2 | 1/2007 | Meikrantz et al. |
| 7,235,216 B2 | 6/2007 | Kiselev et al. |
| 2002/0034275 A1 | 3/2002 | Abalin et al. |
| 2003/0012325 A1 | 1/2003 | Kernert et al. |
| 2003/0016775 A1 | 1/2003 | Jamriska, Sr. et al. |
| 2003/0103896 A1 | 6/2003 | Smith |
| 2003/0179844 A1 | 9/2003 | Filippone |
| 2004/0091421 A1 | 5/2004 | Aston et al. |
| 2004/0105520 A1 | 6/2004 | Carter |
| 2004/0196942 A1 | 10/2004 | Mirzadeh et al. |
| 2004/0196943 A1 | 10/2004 | Di Caprio |
| 2005/0105666 A1 | 5/2005 | Mirzadeh et al. |
| 2005/0118098 A1 | 6/2005 | Vincent et al. |
| 2006/0062342 A1 | 3/2006 | Gonzalez Lepera et al. |
| 2006/0126774 A1 | 6/2006 | Kim et al. |
| 2007/0133731 A1 | 6/2007 | Fawcett et al. |
| 2007/0133734 A1 | 6/2007 | Fawcett et al. |
| 2007/0165767 A1* | 7/2007 | Labarriere et al. ............ 376/446 |
| 2007/0297554 A1 | 12/2007 | Lavie et al. |
| 2008/0031811 A1 | 2/2008 | Ryu et al. |
| 2008/0076957 A1 | 3/2008 | Adelman |

FOREIGN PATENT DOCUMENTS

| | | |
|---|---|---|
| EP | 0 425 856 | 5/1991 |
| JP | 58-72096 | 4/1983 |
| JP | S61-256296 | 11/1986 |
| JP | 62-102184 | 5/1987 |
| JP | 01-101497 | 4/1989 |
| JP | 2002-533735 | 8/2002 |
| JP | 2006-162613 | 6/2006 |
| JP | 2006162613 A * | 6/2006 |
| RU | 6465 U1 | 4/1998 |
| WO | WO 00/39807 | 7/2000 |

OTHER PUBLICATIONS

U.S. Appl. No. 11/002,680, filed Dec. 3, 2004, Fawcett et al.
U.S. Appl. No. 11/002,677, filed Dec. 3, 2004, Fawcett et al.
Extended European Search Report dated May 26, 2009.
Translation of Japanese Office Action dated Aug. 15, 2013 in corresponding Japanese Application No. 2008-292874.
Translation of Japanese Office Action dated Dec. 16, 2013 in corresponding Japanese Application No. 2008-292874.
Taiwanese Office Action dated Dec. 3, 2013 in corresponding Japanese Application No. 2008-292874.
Chinese Office Action dated Mar. 28, 2012 for corresponding Chinese Application No. 200810179649.9 (full English language translation).
Russian Decision on Grant dated Jun. 29, 2012 for Russian Application No. 2008146951/07 (061391), full English language translation provided.

* cited by examiner

FAIL-FREE FUEL BUNDLE ASSEMBLY

FIELD

The present teachings relate to nuclear reactor fuel bundle assemblies.

BACKGROUND

The statements in this section merely provide background information related to the present disclosure and may not constitute prior art.

Nuclear reactors, such as boiling water reactors, generally include a reactor core comprised of many fuel bundles through which, and around which, a liquid moderator or coolant, e.g., liquid water, flows. Nuclear reactions within the fuel bundles generate heat used to convert the coolant to steam as the coolant passes through the core. The steam is then used to generate electrical power. Each of the fuel bundles typically includes a plurality of sealed and vertically upstanding fuel rods housed within an elongate tubular channel. Within the channel, the fuel rods of each fuel bundle are held in a spaced apart configuration by two or more spacer grids comprised of a plurality of interconnected spacers that form a plurality of rows and columns of open cells. Each cell has a respective one of the otherwise long and flexible fuel rods extending therethrough and serves to prevent the fuel rods from coming into abrading contact one with another under the dynamics of coolant flow within the reactor. The spacers additionally maintain the designed fuel-rod-to-fuel-rod spacing for optimum nuclear performance and promote mixing of the moderator.

The fuel rods are generally a monolithic structure having a length substantially equal to the overall length of the respective bundle. Additionally, each of the fuel rods typically includes an inner axial bore extending approximately the entire length of the respective rods. Nuclear fuel, e.g., uranium 235, is deposited within the inner bore to generate the nuclear reaction. Accordingly, the enrichment level of the fuel within each such fuel rod is generally consistent along the length of the rods.

Additionally, most known spacers have very complex designs that can impede the flow of coolant through the respective bundle and often entrap debris flowing though the bundle. Such entrapped debris can vibrate, flap or rattle against the fuel rods due to the coolant flow and damage fuel rods, causing potential exposure of the fuel to the water in the reactor.

SUMMARY

According to various aspects a fuel bundle for a nuclear reactor core is provided. In various embodiments the fuel bundle may include a plurality of rods comprised of nuclear fuel rods and/or isotope production rods. Each rod includes a plurality of interconnected rod segments, wherein at least two of the rod segments of at least one rod have different outside diameters. The fuel bundle may additionally include a plurality of rod spacer grids securely retained between axially adjacent, interconnected rod segments. The rod spacer grids interconnected to axially adjacent rod segments form an array of substantially equally spaced rods. The fuel bundle may further include an elongate tubular channel in which the arrayed rods are housed.

In various other embodiments the fuel bundle may include a plurality of rods comprised of nuclear fuel rods and/or isotope production rods. Each rod includes a plurality of interconnected rod segments, wherein each rod segment has an internal cavity for retaining either nuclear fuel or a plurality of isotope production targets. At least two of the rod segments of at least one rod may have different outside diameters, different axial lengths, different nuclear fuel enrichment values, and/or different isotope targets. The fuel bundle may additionally include a plurality of rod spacer grids securely retained between axially adjacent, interconnected rod segments to form an array of substantially equally spaced rods.

According to other aspects, a rod for a fuel bundle for a nuclear reactor core is provided. The rod may comprise a fuel rod or an isotope production rod. In various embodiments, the rod can include a plurality of interconnected rod segments, wherein each rod segment includes an internal cavity for retaining nuclear fuel or a plurality of isotope production targets. The rod may additionally include a solid first end portion having an axial length sufficient to prevent rupturing the internal cavity due to fretting damage by debris entrapped at the interconnection of the respective axially adjacent rod segments. The rod may further include a partially solid second end portion having an axial length sufficient to prevent rupturing the internal cavity of the respective central body due to fretting damage by debris entrapped at the interconnection of the respective axially adjacent rod segments. In various implementations, the rod may include at least two of the rod segments having different outside diameters, different axial lengths, different nuclear fuel enrichment values and/or different isotope targets.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

The following description of various exemplary embodiments is merely exemplary in nature and is in no way intended to limit the disclosure, its application or uses. Additionally, the advantages provided by the various embodiments, as described below, are exemplary in nature and not all embodiments provide the same advantages or the same degree of advantages.

Figure 1:
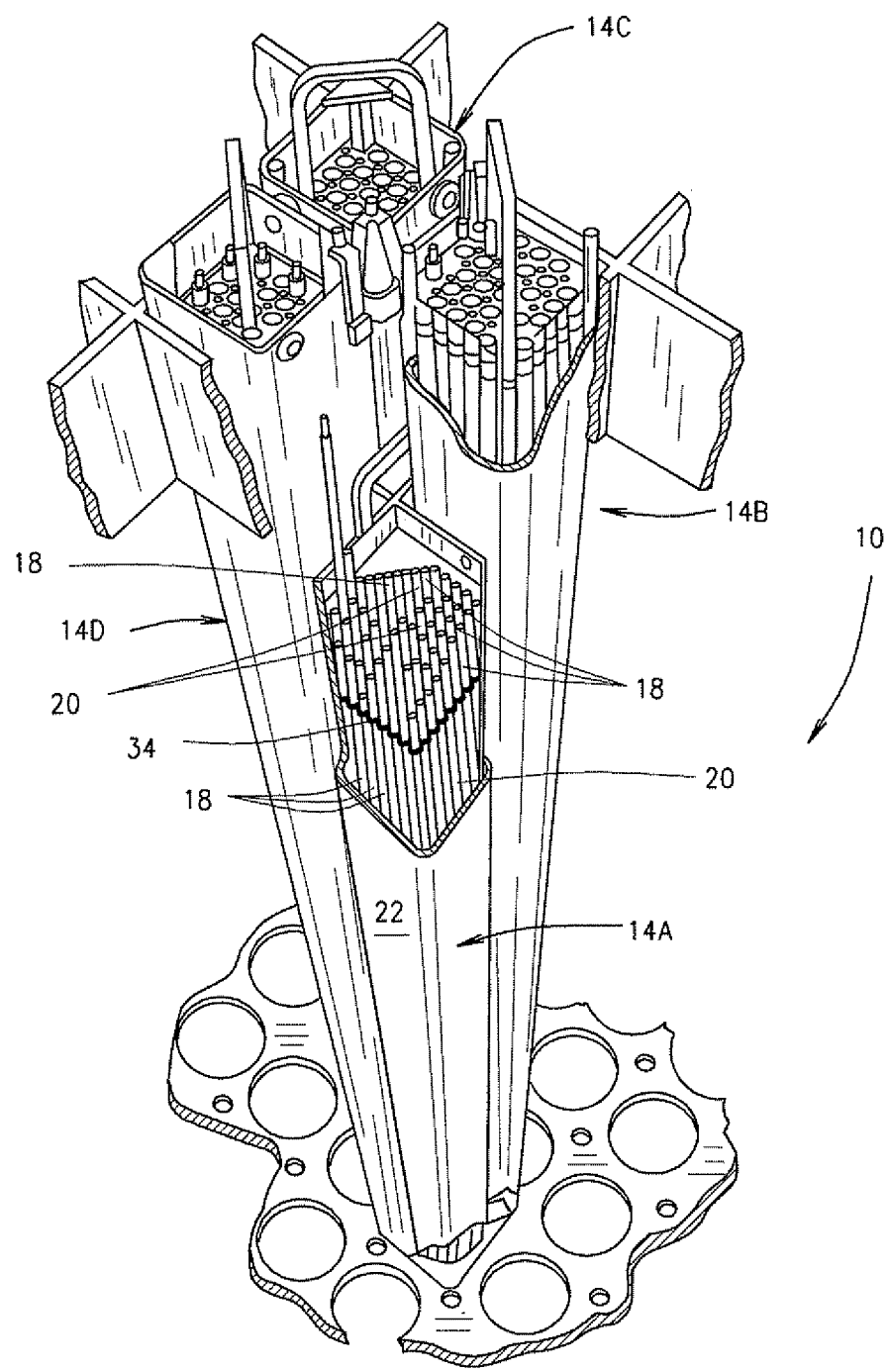
FIG. 1 is a perspective sectional view of a portion of a nuclear reactor core illustrating a plurality of fuel bundle assemblies including fuel rods, isotope production target rods, tie plates, spacer grids and channels, in accordance with various embodiments of the present disclosure.

Referring to FIG. 1, a perspective sectional view of an exemplary portion of a power generating nuclear reactor core 10, e.g., a portion of a boiling water nuclear reactor core, is provided. The exemplary portion of the power generating nuclear reactor core 10 includes four fuel bundle assemblies 14A, 14B, 14C and 14D through which, and around which, a liquid moderator or coolant flows when the fuel bundles 14A, 14B, 14C and 14D are installed and the reactor is functioning. For brevity, the fuel bundle assemblies 14A, 14B, 14C and 14D will simply be referred to herein as fuel bundles 14A, 14B, 14C and 14D. Nuclear reactions within each fuel bundle 14A, 14B, 14C and 14D generate heat used to convert the coolant to steam that is used to generate electrical power. Each fuel bundle 14A, 14B, 14C and 14D is substantially the same in structure, form and function. Thus, for simplicity and clarity, only fuel bundle 14A will described herein.

Figure 2:
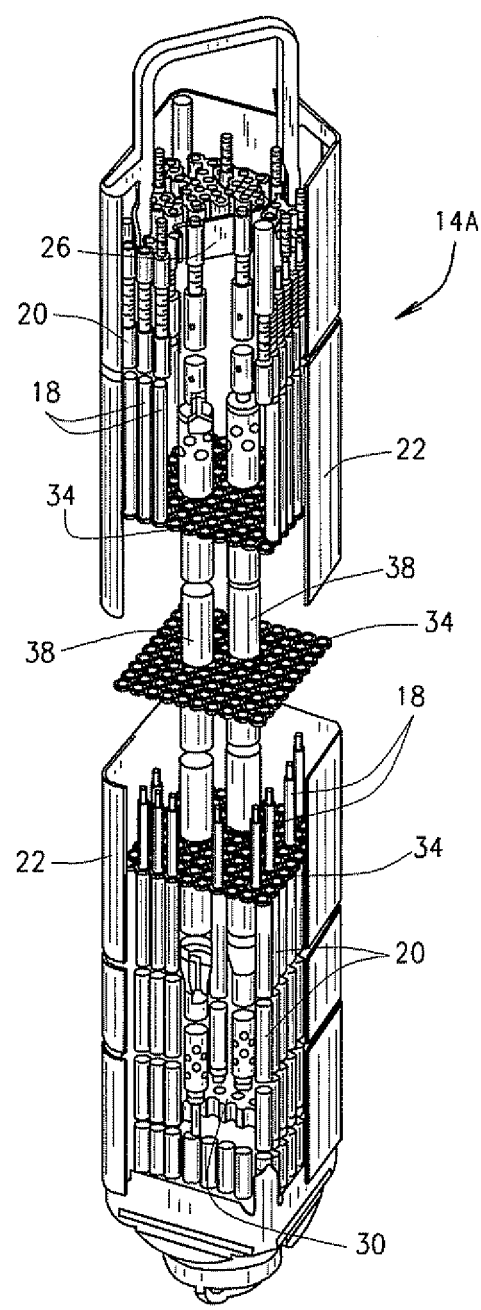
FIG. 2 is a partially exploded sectional view of an exemplary fuel bundle assembly included in the portion of a nuclear reactor core shown in FIG. 1, in accordance with various embodiments of the present disclosure.

Referring also to FIG. 2, the fuel bundle 14A generally includes a plurality of fuel rods 18 and, in various embodiments, a plurality of isotope production rods 20. The fuel bundle 14A additionally includes an outer channel 22 surrounding an upper tie plate 26 and a lower tie plate 30. The plurality of fuel rods 18 and isotope production rods 20 are arranged in an array within the fuel bundle 14A by a plurality of spacer grids 34 longitudinally, or axially, spaced one from the other along the length of the fuel bundle 14A. The fuel rods 18, isotope production rods 20, and typically one or more water rods 38, are maintained in spaced relation, i.e., an array, to each other within the fuel bundle 14A by the spacer grids 34 so as to define passages for the reactor coolant flow between fuel rods 18 and isotope production rods 20. Generally, the fuel bundle 14A may include any number of spacer grids 34 spaced along the entire axial length of the fuel bundle 14A as needed for maintaining the fuel rods 18, isotope production rods 20 and water rods 38 in the desired array, e.g., three to ten spacer grids 34.

Generally, the fuel rods 18 contain nuclear fuel, e.g., uranium, that produces a neutron flux, while the isotope production target rods 20 contain irradiation targets that are irradiated by the neutron flux to produce a desired radioisotope. The irradiation targets may be fabricated of any desired isotope such as cadmium, cobalt, iridium, nickel, thallium, etc. In various embodiments, the fuel and isotope production target rods 18 and 20 have substantially the same construction, with the exception of fuel rods 18 containing nuclear fuel and the isotope production target rods 20 containing the irradiation targets. Therefore, for simplicity, only the construction, function, components, elements, assemblies, features, attributes, etc., of the fuel rods 18 will be further described below.

Figure 3:
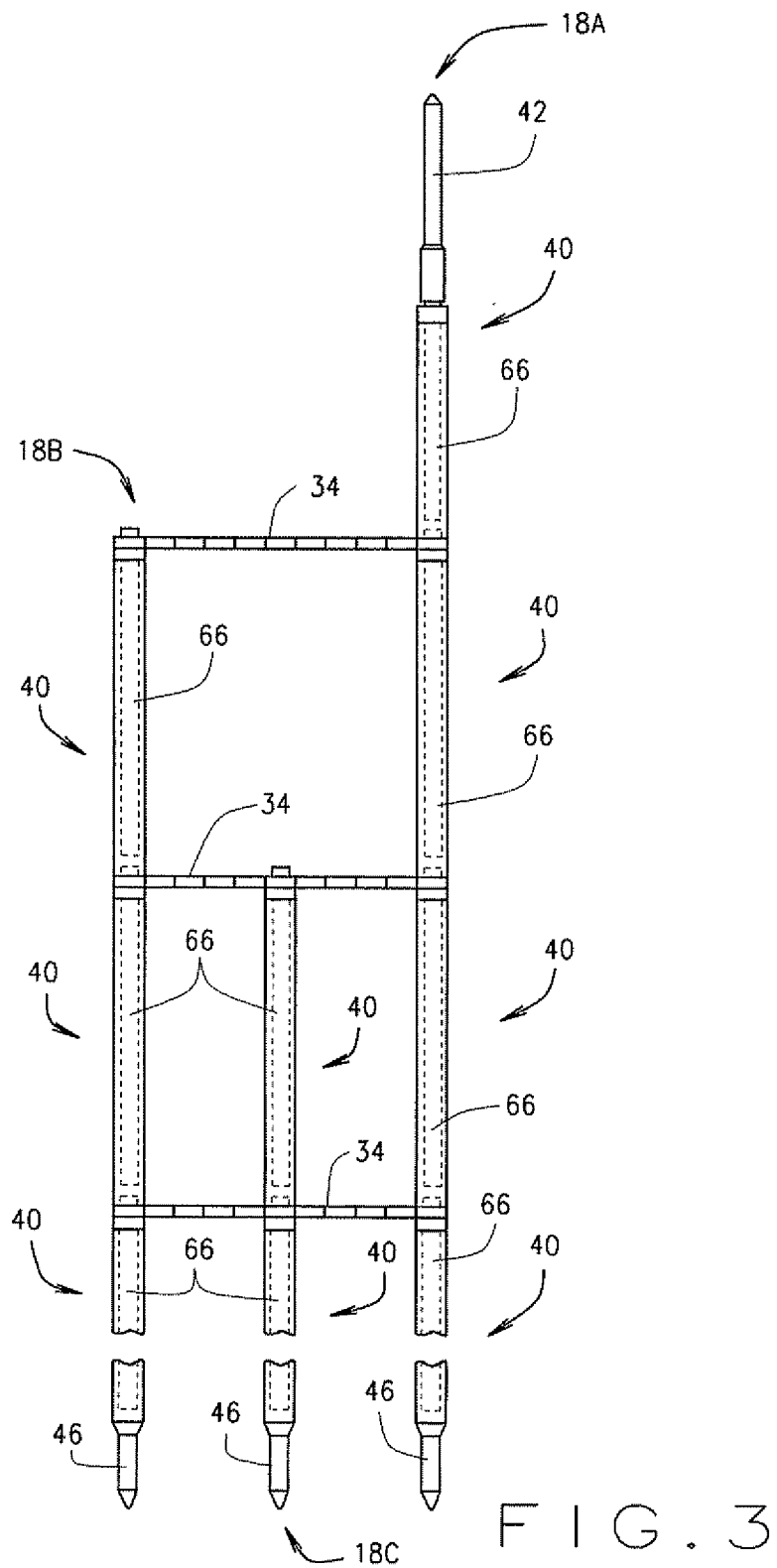
FIG. 3 illustrates various multi-segment fuel and/or isotope production target rods that may be included within the fuel bundle assembly shown in FIG. 2, in accordance with various embodiments of the present disclosure.
Figure 4:
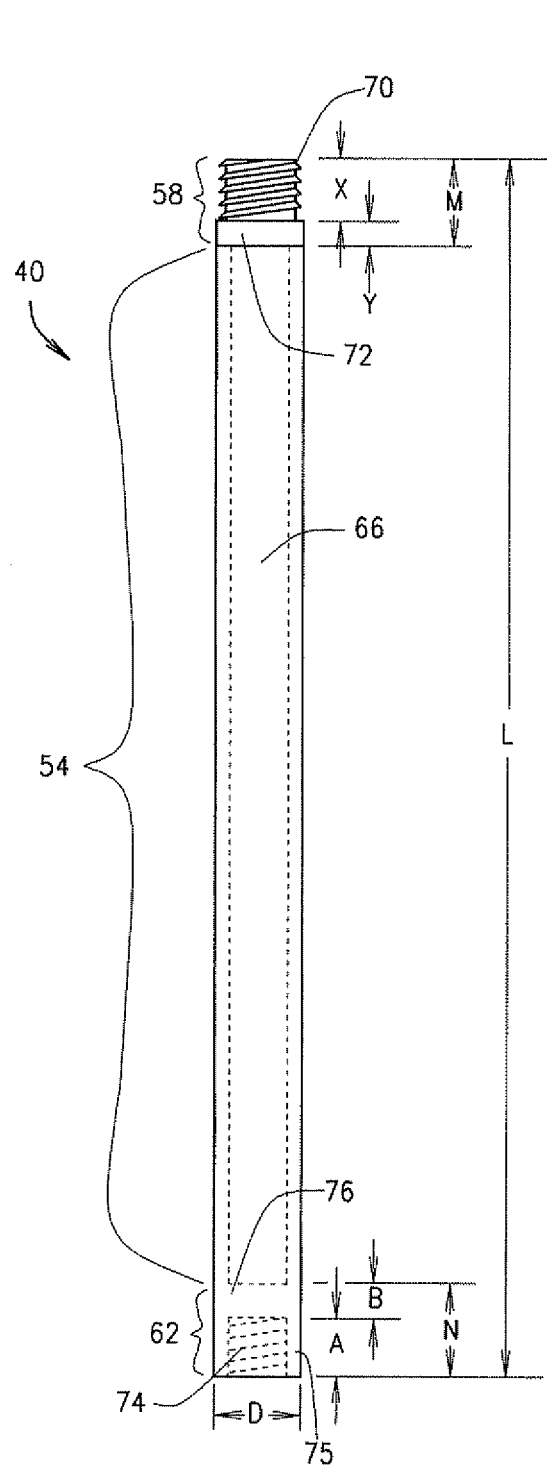
FIG. 4 is an exemplary illustration of a fuel and/or isotope production target rod segment included in the multi-segment fuel and/or isotope production target rods shown in FIG. 3, in accordance with various embodiments of the present disclosure.

Referring now to FIGS. 3 and 4, in various embodiments, the fuel rods 18 (and the isotope production target rods 20) may be multi-segment rods comprised of a plurality of interconnected rod segments 40. Each multi-segment fuel rod 18 includes one or more rod segments 40 that are interconnected such that each respective multi-segment fuel rod 18 may generally have any desired axial length. For example, a plurality of rod segments 40 may be interconnected to construct full length segmented fuel rods, such as segmented fuel rod 18A shown in FIG. 3, and/or one or more rod segments 40 may be interconnected to construct part length segmented fuel rods, such as segmented fuel rods 18B and/or 18C shown in FIG. 3. More particularly, each full length segmented fuel rod 18A is constructed of a plurality of rod segments 40 having an aggregated axial length approximately equal to the distance between upper and lower tie plates 26 and 30 (shown in FIG. 2). Each full length segmented fuel rod 18A may additionally include an upper end pin 42 and a lower end pin 46 connected to the respective upper and lower ends of the aggregated full length fuel rod 18A. The upper and lower end pins 42 and 46 are structured to mate with the respective upper and lower tie plates 26 and 30 to stabilize the ends of each respective full length segmented fuel rod 1 BA within the channel 22.

Furthermore, each part length segmented fuel rod 18B and 18C is constructed to have any desirable axial length less than the axial length between upper and lower tie plates 26 and 30. For example, each part length segmented fuel rod 18B and 18C may be constructed to have an axial length approximately equal to ¾, ½, ¼, etc. of the distance between upper and lower tie plates 26 and 30. Each part length segmented fuel rod 18B and 18C may additionally include an upper end pin 42 and/or a lower end pin 46 connected to the respective upper and/or lower end of the respective aggregated part length fuel rods 18B and 18C. Each of the upper and lower end pins 42 and 46 are structured to mate with a respective one of the upper and lower tie plates 26 and 30 and one of the spacer grids 34 to stabilize the ends of each respective part length segmented fuel rods 18B and 18C within the channel 22. Alternatively, each part length segmented fuel rod 18B and 18C may include an upper end pin 42 or a lower end pin 46 connected to the respective upper or lower end of the respective aggregated part length fuel rods 18B and 18C, and a first connector 50 (described in detail below) connected to the opposing upper or lower end of the respective multi-segment part length fuel rods 18B and 18C. According, the upper or lower end pin 42 or 46 is structured to mate with a respective one of the upper or lower tie plates 26 and 30 and the first connector 50 is structured to mate with one of the spacer grids 34 to stabilize the ends of each respective part length segmented fuel rods 18B and 18C within the channel 22.

Figure 5:
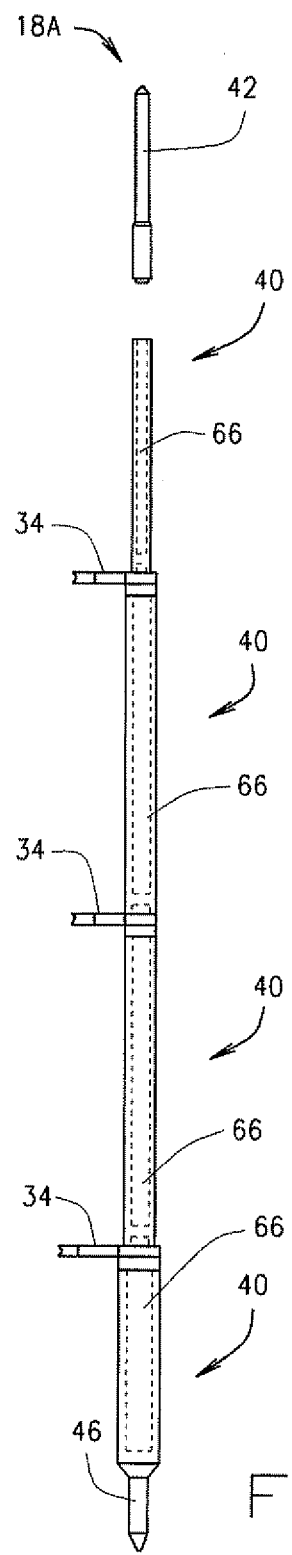
FIG. 5 is an exemplary illustration of a multi-segment fuel and/or isotope production rod shown in FIG. 3, including rod segments shown in FIG. 4 having varying axial lengths and diameters, in accordance with various embodiments of the present disclosure.

Referring now to FIGS. 4 and 5, each rod segment 40 may have any desirable axial, or longitudinal, length and/or outside diameter D. Thus, each multi-segment fuel rod 18 (and isotope production rod 20) may be assembled to have any desired aggregated, or cumulative, length by interconnecting various length rod segments 40. Additionally, each multi-segment fuel rod 18 (and isotope production rod 20) may be assembled to have one or more outside diameters along the axial length of the respective aggregated segmented rod 18 (or 20) by interconnecting various diameter rod segments 40. Therefore, it should be understood that FIG. 4 illustrates an exemplary fuel and/or isotope production rod segment 40 and the accompanying description herein relates to each rod segment 40 of each multi-segment fuel and/or isotope production rod 18 and/or 20, regardless of the length and/or diameter of each respective rod segment 40.

With particular reference to FIG. 4, each rod segment 40 generally includes a central body portion 54, a first end portion 58 and an opposing second end portion 62. In various implementations, at least one of the first and second end portions 58 and 62 are separate components from the central body portion 54 (only the first portion 58 is shown as such) in order to provide access to an internal cavity 66 of the central body portion 54. The internal cavity 66 is structured to retain nuclear fuel (or a plurality of irradiation targets in the case of isotope production rods 20). Thus, the cavity 66 is accessible prior to the first and/or second end portions 58 and/or 62 being connected to the respective end(s) of the central body 40. Particularly, once the desired nuclear fuel or isotope targets, having a desired enrichment, are placed within the internal cavity 66, the first and/or second end portions 58 and/or 62 are connected, i.e., welded, to the respective end of the central body portion 54 to seal the nuclear fuel or isotope targets within the rod segment 40.

It should be understood that, as used herein, the term 'enrichment', as applied to nuclear fuel and isotope targets, is defined to inclusively mean nuclear fuel types, nuclear fuel enrichment values, isotope target types and isotope target enrichment values.

In various embodiments, the first end portion 58 has an axial length M and includes a male connector 70, e.g., a threaded stud or post, having an axial length X, extending from a base 72, having an axial length Y. In various implementations the first end portion 58, including the male connector 70 and base 72, is fabricated of a solid material. For example, in various embodiments, first end portion 58 is fabricated of a solid low nuclear cross-section material such as zirconium, zircaloy-2, zircaloy-4, or any other suitable low nuclear cross-section material. Furthermore, in various embodiments, the second end portion 62 has an axial length N and includes a female receptacle 74, e.g., a threaded internal bore with a solid wall 75, having an axial length A and a solid base 76 having an axial length B. In various implementations the second end portion 62, including the solid base 76 and solid wall 75, is fabricated of a low nuclear cross-section material such as zirconium, zircaloy-2, zircaloy-4, or any other suitable low nuclear cross-section material.

The male connector 70 and female receptacle 74 are structured to be mateable for interconnecting the respective rod segments 40. More specifically, in various embodiments, the male connector 70 and female receptacle 74 are interconnected through an aperture 78 of a respective spacer grid 34 (shown in FIG. 6), as described in detail below. Although the male connector 70 is described and shown herein as being part of the first end portion 58, and the female receptacle 74 is described and shown herein as being part of the second end portion 62, it is envisioned that in various embodiments, the first end portion 58 may include the female receptacle 74 and the second end portion 62 may include the male connector 70. Additionally, the male connector 70 and female receptacle 74 of the respective upper-most and lower-most rod segments 40 of any assembled multi-segment fuel rod 18 may be coupled to the respective upper and lower end pins 42 and 46. Furthermore, although the male connector 70 and female receptacle 74 are illustrated as including threads that may be engaged, i.e., threaded together, to interconnect the respective rod segments 40, it should be understood that the male connector 70 and female receptacle 74 may comprise any mateable connecting devices or components suitable to interconnect through a respective space grid aperture 78, and remain within the scope of the present disclosure. For example, in various embodiments the male connector 70 and female receptacle 74 may respectively comprise a tang and receptor, an internal hook and loop, etc.

Figure 6:
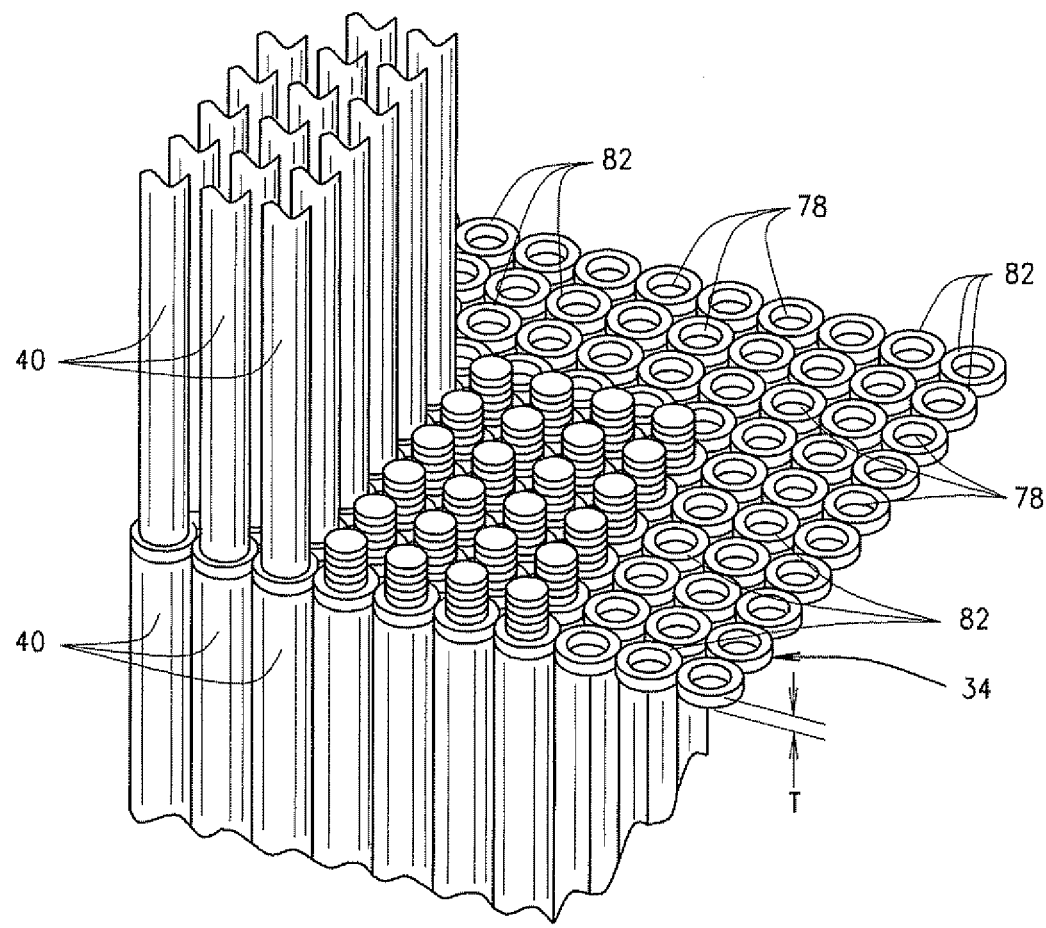
FIG. 6 is an isometric view of a portion of the exemplary fuel bundle shown in FIG. 2, illustrating a spacer grid fixedly retained between interconnecting rod segments, in accordance with various embodiments of the present disclosure.
Figure 7:
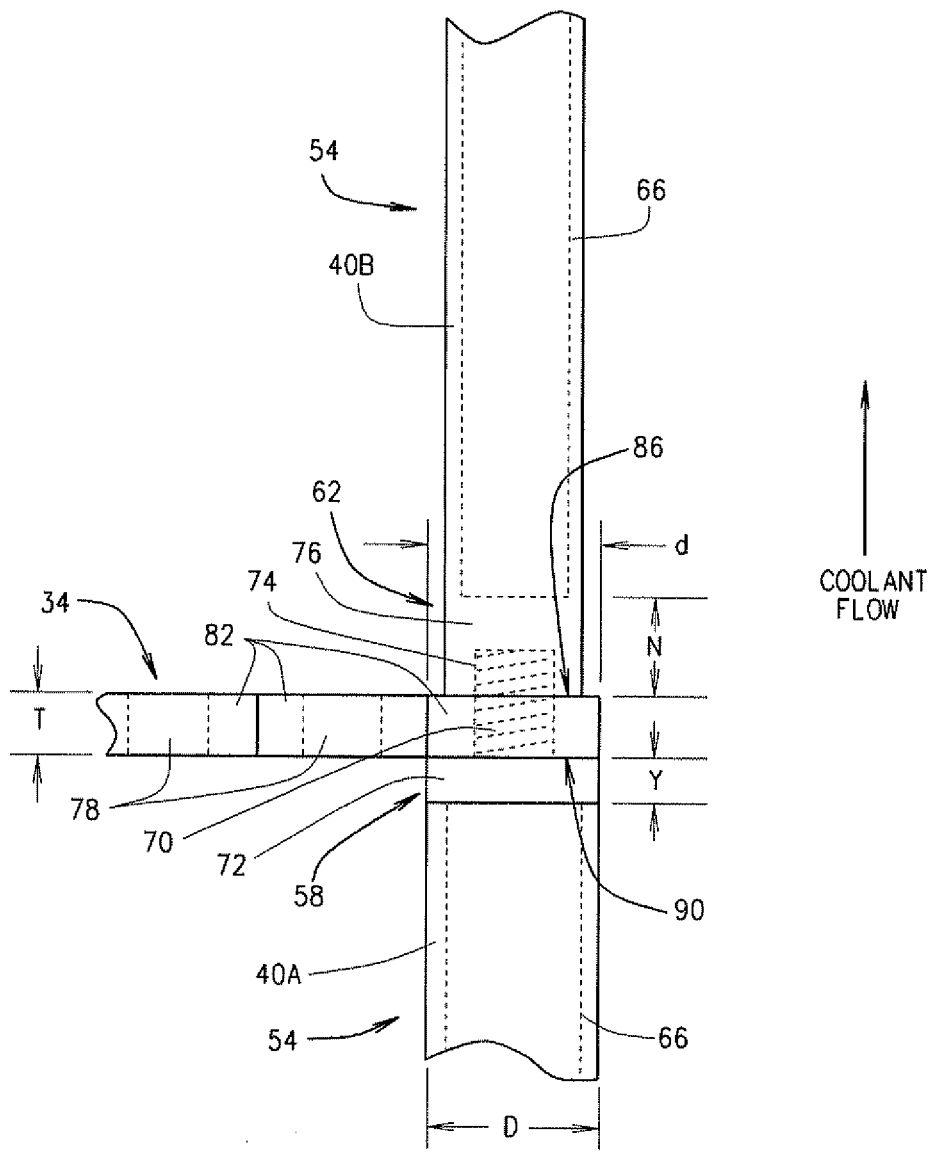
FIG. 7 is side view of a portion of the spacer grid fixedly retained between interconnecting rod segments shown in FIG. 6, in accordance with various embodiments of the present disclosure.

Referring now to FIGS. 6 and 7, in various embodiments, the spacer grids 34 of the fuel bundle 14A are comprised of a plurality of interconnected annular disks 82. Each annular disk 82 has a thickness T and includes a respective spacer grid aperture 78. In various embodiments, each annular disk 82 may be fabricated from a low nuclear cross-section material such as zirconium, zircaloy-2, zircaloy-4 or any other suitable low nuclear cross-section material. For example, in various implementations, the spacer grids 34 may be fabricated from a single sheet of low nuclear cross-section material that is machine stamped to form the interconnected annular disks 82 and apertures 78.

The selected rod segments 40 are then interconnected such that the respective aggregated, multi-segment fuel rod 18 (or isotope production rod 20) will have a desired cumulative axial length and a desired sequence of diameters D and enrichments along the cumulative axial length. That is, to assemble the fuel rods 18 (and isotope production rods 20), particular rod segments 40 are selected based on their respective length L, diameter D and enrichment of the fuel (or isotope targets) retained with the respective internal cavities 66. More specifically, a plurality of rod segments 40 may be constructed, or manufactured, to provide a large assortment of rod segments having various different lengths L, diameters D and/or enrichments. Then, to assemble a fuel rod 18 (or isotope production rod 20) a plurality of specific rod segments 40 may be selected based on their respective length L, diameter D and enrichment. Therefore, aggregated, multi-segment fuel rods 18 (and isotope production rods 20) may be easily and quickly assembled to have axially varying diameters D and enrichments, i.e., diameters D and enrichments that vary along the axial length of the respective aggregated fuel rod 18 (or isotope production rod 20).

Moreover, in various embodiments, to interconnect each axially adjacent pair of rod segments 40, the male connector 70 of a first rod segment 40 having a desired length L, diameter D and enrichment, e.g., rod segment 40A in FIG. 7, is inserted through a selected one of the annular disk apertures 78. The female receptacle 74 of a second rod segment 40 having a desired length L, diameter D and enrichment, e.g., rod segment 40B in FIG. 7, is then fixedly interconnected with the male connector 70 of the first rod segment 40B. Accordingly, the respective annular disk 82 is fixedly retained between the first and second rod segments 40A and 40B. Subsequent rod segments 40 having a respective desired length L, diameter D and enrichment may then be interconnected with the first and/or second rod segments 40A and/or 40B and/or other subsequent rod segments 40, retaining other spacer grid annular disks 82 there between, in a similar manner. Thus, each multi-segment fuel rod 18 (or isotope production rod 20) may be assembled to have an axially varying diameter D and axially varying nuclear fuel (or isotope target) enrichment.

The enrichment of each respective rod segment 40 may be related to the diameter D of each respective rod segment 40, and/or the amount of fuel (or isotope targets) retained within the respective internal cavity 66 and/or the quality of the respective fuel or isotope targets. That is, larger diameter rod segments 40 may allow more nuclear fuel (or isotope targets) to be retained within the respective cavity 66. However, the cavities 66 of two different rod segments 40 having the same diameter D may retain differing amounts of nuclear fuel (or isotope targets), and/or differing qualities, i.e., different enrichments, to provide rod segments 40 with the same diameter D but different enrichments. Or, rod segments 40 having different diameters D, and thus, different size internal cavities 66, may retain nuclear fuel (or isotope targets) having the same enrichment value, but the smaller diameter rod segment 40, retaining less of nuclear fuel (or isotope targets) will have a lower enrichment, Or, a rod segment 40 having a first diameter D may retain nuclear fuel (or isotope targets) having a first enrichment value, and a second rod segment 40 having a smaller second diameter D may retain nuclear fuel (or isotope targets) having a greater second enrichment value. Thus, the first rod segment 40 would have a larger diameter D, but a lower enrichment than the second rod segment 40.

Furthermore, to improve efficiency of the reactor core 10, it can be advantageous to have larger diameter, higher enrichment rod segments 40 near the lower portion of the fuel bundle 14A, i.e., the lower portion of the reactor core 10, where the hydrogen to uranium (H/U) ratio of the coolant is the greatest. It can further be advantageous to have progressively ascending smaller diameter, lower enrichment rod segments 40 along the axial length of each respective multi-segmented rod 18 (and/or 20) to reduce the decrease in the H/U ratio that can occur along the length of the fuel bundle 14A due to conversion of the coolant to steam.

Thus, in addition to providing a means to control enrichment of a respective rod segment 40, i.e., providing lower enrichment, the diameter D of each rod segment 40 may provide the ability to maintain a more consistent H/U ratio along the axial length of the fuel bundle 14A, i.e., along the axial length of the reactor core 10. That is, assembling fuel rods 18 (and/or isotope production rods 20) to have progressively ascending smaller diameter rod segments 40 allows for an increasingly greater area of coolant from the bottom of the reactor core to the top. Progressively increasing the coolant area along the axial length of the reactor core 10 provides more hydrogen along the length of each respective fuel bundle 14, thereby lessening the effects that the transformation of the coolant from water to steam will have on the H/U ratio.

As best illustrated in FIG. 7, in various embodiments, a diameter d or each respective annular disk 82 of each respective spacer grid 34 is substantially equal to, or smaller than, the diameter D of the lower of the rod segments 40 retaining the respective spacer grid 34 there between. That is, the diameter d of each annular disk 82 is substantially equal to, or smaller than, the diameter D of the one of the pair of rod segments 40 retaining the respective annular disk 82 that is nearer the bottom of the reactor core 10. Therefore, there is no 'step-up' offset, i.e., increases in diameter, from the outer surface of the lower rod segment 40 to the peripheral outer surface of respective annular disk 82. This substantially reduces impedance of coolant flow along the outer surfaces of the rod segments 40 and across the peripheral outer surfaces of the annular disks 82 and through the fuel bundle 14A. Additionally, having the diameter d of each annular disk 82 substantially equal to, or smaller than, the diameter D of the respective lower rod segments 40 substantially reduces the potential for debris to become entrapped by the spacer grids 34 at the junction of the annular disks 82 and the lower rod segments 40. As described above, entrapped debris can vibrate, flap or rattle against the fuel rods 18 (and/or isotope production rods 20) due to the coolant flowing through the fuel bundle 14A. Such vibrating, flapping or rattling of entrapped debris can cause fretting or abrading of the fuel rods 18 (and/or isotope production rods 20) and subsequently cause critical damage to the rods 18 and/or 20, i.e., breach or rupture a rod segment internal cavity 66.

Additionally, to substantially eliminate the risk of critical damage of the respective rod segments 40 due to fretting or abrading by entrapped debris, each rod segment 40 includes the first and second end portions 58 and 62. More specifically, as described above, the first end portion 58 of each rod segment 40 may be fabricated from a solid material, e.g., a solid low nuclear cross-section material. Additionally, as described above, the second end portion base 76 and internal bore wall 75 are fabricated from a solid material, e.g., a solid low nuclear cross-section material. Still more particularly, as illustrated in FIG. 7, when the axially adjacent rod segments 40, e.g., rod segments 40A and 40B, are fixed coupled together retaining the respective spacer annular disk 82 there between, the solid male connector 70 is engaged within the female receptacle 74. Thus, once axially adjacent rod segments 40 are interconnected, the respective second end portion 62 includes the solid base 76, the female receptacle 74 and a portion of the solid male connector 70 mated within the female receptacle 74. Therefore, once axially adjacent rod segments 40 are interconnected, the respective second end portion 62 is substantially solid.

Still further, as is clearly illustrated in FIG. 7, and readily understood by one skilled in the art, once axially adjacent rod segments 40 are interconnected, the entire length N of the respective second end portion 62 is positioned adjacent a first, or top face 86 of the respective annular disk 82, while only the length Y of the respective first end portion base 72 is positioned adjacent an opposing second, or bottom face 90 of the respective annular disk 82. In various implementations, the rod segments 40 and spacer grids 34 are interconnected having the male connector 70 positioned upward, i.e., pointing in the direction of the top of the reactor core 10. Therefore, with respect to orientation within the reactor core 10, once axially adjacent rod segments 40 are interconnected, the substantially solid second end portion 62 of the respective upper rod segment 40 is positioned above the respective annular disk 82 and the solid first end portion base 72 of the respective lower rod segment 40 is positioned below the respective annular disk 82. Accordingly, with respect to orientation within the reactor core 10, each respective interconnection of adjacent rod segments 40 will have a first section of solid material, i.e., the substantially solid second end portion 62, having a length N above each respective spacer grid annular disk 82 and a second section of solid material, i.e., the first end portion base 72, having a length Y below each respective spacer grid annular disk 82. The lengths N and Y may be any desirable length suitable to prevent entrapped debris from causing fretting damage to the central body portion 54 of any rod segment 40. Fretting damage to the central body portion 54 could cause exposure of nuclear reactive material, i.e., nuclear fuel or radioactive isotope targets, if the internal cavity 66 were breached due to such fretting. For example, in various embodiments, the lengths N and Y may be approximately ½ inch to 1½ inches, or greater.

Thus, any debris that may get entrapped at the respective spacer grid 34 and caused by coolant flowing through the fuel bundle 14A to fret or abrade one or both of the respective axially adjacent rod segments 40, will only fret or abrade the respective solid first end portion base 72 and/or the respective substantially solid second end portion 62. Moreover, since the coolant flows upward through the reactor core 10, entrapped debris is more likely to vibrate, flap or rattle due to the coolant flow, against the substantially solid second end portion 62 of the upper rod segment 40. Therefore, in various embodiments, wherein the substantially solid second end portion 62 of each respective rod segment 40 is positioned above the respective annular disk 82, the length N of the second portion 62 is greater than the length Y of the respective first portion base 72. Thus, each respective interconnection of adjacent rod segments 40 will have a greater axial length of solid material above each respective spacer grid annular disk 82 than below each respective spacer grid annular disk 82. For example, in various embodiments, the length N may be approximately ½ inch to 1½ inches, or greater, and the length Y may be approximately equal to ⅛ to ⅞ the length of N, e.g., approximately ¼ inch to 1½ inches.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A fuel bundle for a nuclear reactor core, said fuel bundle comprising:
   a plurality of rods including at least one of fuel rods and isotope production rods, each rod including a plurality of axially adjacent interconnected rod segments with at least a first rod segment and a second rod segment, each of the rod segments having a first end portion, a second end portion, and a central body portion between the first end portion and the second end portion, the central body portion including an internal cavity, the first and second rod segments having different outside diameters;
   a rod spacer grid securely retained between each pair of axially adjacent interconnected rod segments to form an array of substantially equally spaced rods; and
   an elongate tubular channel in which the arrayed rods are housed,
   wherein
   each of the rod spacer grids includes a plurality of annular disks, at least one of the plurality of annular disks securely retained between the first rod segment and the second rod segment, the at least one annular disk having a top horizontal surface and a bottom horizontal surface,
   the central body portion of the first rod segment has an outer diameter of D1 and the first end portion of the first rod segment includes a first horizontal surface contacting the bottom horizontal surface of the at least one annular disk, and the first end portion of the first rod segment has a length Y defined as a distance from the first horizontal surface to the central body portion of the first rod segment,
   the central body portion of the second rod segment has an outer diameter of D2 and the second end portion of the second rod segment includes a second horizontal surface contacting the top horizontal surface of the at least one annular disk, and the second end portion of the second rod segment has a length N defined as a distance from the second horizontal surface to the central body portion of the second rod segment, and
   length N>length Y and diameter D1>diameter D2.

2. The fuel bundle of claim 1, wherein the internal cavity is for retaining one of nuclear fuel and a plurality of isotope production targets such that each rod segment has a respective enrichment value and at least two of the rod segments of at least one rod have different enrichment values.

3. The fuel bundle of claim 1, wherein each rod segment has a respective axial length and at least two of the rod segments of at least one rod have different axial lengths.

4. The fuel bundle of claim 1, wherein the first end portion is a solid first end portion and the second end portion is a partially solid second end portion, and the first and second end portions are mateable to interconnect axially adjacent rod segments such that a respective one of the spacer grids is fixedly retained there between.

5. The fuel bundle of claim 4, wherein the first and second end portions are fabricated from one of zirconium, zircaloy-2, and zircaloy-4.

6. The fuel bundle of claim 4, wherein the first end portion comprises a male connector and the second end portion comprises a female receptacle structured to securely mate with a male connector of an axially adjacent rod segment to interconnect axially adjacent rod segments.

7. The fuel bundle of claim 6, wherein each spacer grid includes a plurality of interconnected annular disks, each annular disk including an aperture sized to receive the male connector such that each respective annular disk can be securely retained between axially adjacent, interconnected rod segments.

8. The fuel bundle of claim 7, wherein each annular disk is structured to have an outside diameter that is substantially equal to, or less than, the outside diameter of the respective rod segment interconnected below each respective annular disk, with respect to orientation within the reactor core.

9. The fuel bundle of claim 4, wherein the solid first end and the partially solid second end portions are mateable such that each interconnection of axially adjacent rod segments comprises:
   a first section of solid material adjacent a first side of the respective spacer grid, the first section of solid material having an axial length sufficient to prevent rupturing the internal cavity of the respective central body due to fretting damage by debris entrapped and the interconnection of the respective axially adjacent rod segments; and
   a second section of solid material adjacent an opposing second side of the respective spacer grid, the second section of solid material having an axial length sufficient to prevent rupturing the internal cavity of the respective central body due to fretting damage by debris entrapped and the interconnection of the respective axially adjacent rod segments.

10. The fuel bundle of claim 9, wherein, with respect to orientation within the reactor core, the first section of solid material is located above the respective spacer grid and has an axial length greater than the axial length of the second section of solid material located below the respective spacer grid.

11. A fuel bundle for a nuclear reactor core, said fuel bundle comprising:
   a plurality of rods comprised of at least one of fuel rods and isotope production rods, each rod including a plurality of axially adjacent interconnected rod segments, at least two of the rod segments having at least one of,
      different outside diameters, the outside diameters being outside diameters of central body portions of the at least two rods, and the larger of the outside diameters is substantially equal to an outside diameter of an annular disk that is secured between two axially adjacent interconnected rod segments and configured to provide lateral and axial support to the two axially adjacent interconnected rod segments, and
      different axial lengths; and
   a rod spacer grid securely retained between each pair of axially adjacent interconnected rod segments to form an array of substantially equally spaced rods,
   wherein
      each rod segment comprises a central body having a respective internal cavity, a solid first end portion having a first horizontal surface configured to contact a lower horizontal surface of a respective one of the rod spacer grids and a length Y defined as a distance from the first horizontal surface to the internal cavity of the rod segment and, a partially solid second end portion having a second horizontal surface configured to contact an upper horizontal surface of a respective one of the rod spacer grids and a length N defined as a distance from the second horizontal surface to the internal cavity of the rod segment, and the first and second end portions are mateable to interconnect axially adjacent rod segments such that the respective spacer grids are fixedly retained there between, the first end portion comprises a male connector and the second end portion comprises a female receptacle configured to securely mate with a male connector to interconnect axially adjacent rod segments, each spacer grid includes a plurality of interconnected annular disks, each annular disk including an aperture sized to receive the male connector such that each respective annular disk can be securely retained between axially adjacent interconnected rod segments, and two rod segments securely retaining one of the spacer grids have different diameters and the length N of one of the two rod segments is greater than the length Y of the other of the two rod segments.

12. The fuel bundle of claim 11, wherein the first and second end portions are fabricated from one of zirconium, zircaloy-2, zircaloy-4.

13. The fuel bundle of claim 11 wherein each interconnected annular disk is structured to have an outside diameter that is substantially equal to, or less than, the outside diameter of the respective rod segment interconnected below each respective annular disk, with respect to orientation within the reactor core.

14. The fuel bundle of claim 11, wherein the solid first end and the partially solid second end portions are mateable such that each interconnection of axially adjacent rod segments comprises:

a first section of solid material adjacent a first side of the respective spacer grid, the first section of solid material having an axial length sufficient to prevent rupturing the internal cavity of the respective central body due to fretting damage by debris entrapped and the interconnection of the respective axially adjacent rod segments; and a second section of solid material adjacent an opposing second side of the respective spacer grid, the second section of solid material having an axial length sufficient to prevent rupturing the internal cavity of the respective central body due to fretting damage by debris entrapped and the interconnection of the respective axially adjacent rod segments.

15. The fuel bundle of claim 14, wherein, with respect to orientation within the reactor core, the first section of solid material is located above the respective spacer grid and has an axial length greater than the axial length of the second section of solid material located below the respective spacer grid.

16. A rod for a fuel bundle for a nuclear reactor core, said rod comprising:

one of a fuel rod and an isotope production rod;

a plurality of axially adjacent interconnected rod segments, each rod segment including, a central body portion with an internal cavity for retaining one of nuclear fuel and a plurality of isotope production targets, a solid first end portion having a first horizontal surface configured to contact a lower surface of a spacer grid and an axial length N sufficient to prevent rupturing the internal cavity due to fretting damage by debris entrapped at the interconnection of the respective axially adjacent rod segments, the axial length N being defined as a distance from the first horizontal surface to the central body portion, and a partially solid second end portion having a second horizontal surface configured to contact an upper surface of a spacer grid and an axial length Y sufficient to prevent rupturing the internal cavity of the respective central body due to fretting damage by debris entrapped at the interconnection of the respective axially adjacent rod segments, the axial length Y being defined as a distance from the second horizontal surface to the central body portion, wherein a solid end portion of one rod segment is configured to attach to a partially solid second end portion of another rod segment such that a spacer grid between the one rod segment and the another rod segment is restrained;

at least two of the rod segments have central body portions with different outside diameters and the N of one of the at least two rod segments having the smaller diameter is greater than the Y of the other of the at least two rod segments and the spacer grid includes a plurality of annular disks, at least one of the plurality of annular disks having an outer diameter substantially equal to the larger of the outside diameters, and at least one of, different axial lengths;

different nuclear fuel enrichment values; and different isotope targets.

17. The rod for a fuel bundle for a nuclear reactor core according to claim 16, wherein the axial length of the partially solid second end portion of the one rod segment is longer than an axial length of a solid first end portion of the another rod segment configured to connect to the second end portion of the one rod segment.

18. The fuel bundle for a nuclear reactor core of claim 11, wherein at least two of the rod segments have at least one of different nuclear fuel enrichment values and different isotope targets.

19. The fuel bundle of claim 1, wherein each rod includes more than two axially adjacent interconnected rod segments.

20. The fuel bundle of claim 11, wherein each rod includes more than two axially adjacent interconnected rod segments.

* * * * *